Sept. 7, 1965  P. G. ROHLAND  3,204,310
ROPE CLAMPS
Filed March 4, 1963

United States Patent Office 3,204,310
Patented Sept. 7, 1965

3,204,310
ROPE CLAMPS
Paul Gerhard Rohland, Solbacken 5, Gothenburg, Sweden
Filed Mar. 4, 1963, Ser. No. 262,671
Claims priority, application Sweden, Nov. 19, 1962,
12,363/62
3 Claims. (Cl. 24—123)

Wire rope clamps for joining rope parts, which are permanently fitted under high pressure, as for instance when making loops, are widely known and used in the trade in the form of metal sleeves. Said sleeves are based upon the principle that the pressure used for fixing should be so high that the metal of the sleeve, which has been chosen for its applicable characteristics, is compressed in such a way during the fitting process that the metal is intensely shaped into and around the rope parts. Rope clamps of this design are intended for high loads in cranes on shipyards etc., and are mostly suitable for wire ropes or ropes of synthetic plastic. Conforming to the strict safety code for such rope clamps a clamp of fashion setting design has established itself on the market. This clamp consists of an oval shaped sleeve into which the two rope parts are fitted so that they overlap. The clamp is then pressed together until it assumes cylindrical or almost cylindrical shape, locking the rope parts together. The size of the pressure depends on the thickness of the clamp metal, which in turn depends upon the diameter of the wire rope. An average of the pressures normally used is around 250 tons for 20 mm. steel cable. In spite of the fact that mainly thin walled sleeves make possible a perfectly safe joint, it has not been possible to utilize such sleeves on account of the sleeve designs known up to now, and of the pressing procedure consequently necessitated.

Making a compression in the direction of the long axis of comparatively thin walled oval metal clamps in order to obtain a circular final shape, will cause folding of the sleeve wall in the central area at the short axis of the sleeve. Such folding of thin walled clamps will cause fissuring of inner and outer surfaces of the sleeve and this involves very serious risks if not discovered during or after the pressing procedure. For safety reasons it has therefore been found necessary to use a metal thickness of the clamp equivalent to one half of the diameter of the rope. The practice of using sleeves, the cross section of which is shaped like a figure eight, in order to force the flow of material in towards the ropes of the central area of the short axis, is also familiar. Even this shape, however, does not allow reduction in the diameter of the wall thickness if the danger of serious fissuring is to be avoided.

It is evident that definite disadvantages are present when using rope clamps, the material thicknesses of which exceeds to a considerable degree what is necessary to meet tensile strength requirements. The clamps become heavy and clumsy and involve unnecessary high material costs, besides which the whole fixing operation is made more inconvenient and the necessary compression pressure has to be higher.

It is an object of this invention to provide a rope clamp oval in section, comparably thin walled and stabilized in such a way that the long sides of the oval will during the high compression maintain their straight direction without any folding tendency.

Another object of the invention is to provide a rope clamp of said type with such a variation in the wall thickness that a reducing of weight is obtained without a reducing of the required clamping security.

Still a further object of the invention is to provide a rope clamp of said type where the deformation of the clamp material during compression is concentrated to certain necessary points only of the oval, leaving other points free from deformation resulting in the possibility of a reduced compression pressure without a reducing of the required clamping security.

With these and other objects in view the invention essentially consists therein that the rope clamp, being oval in cross section with comparatively thin walls of metal, alloy of metals, synthetic plastic or something similar, on both long sides of the oval cross section and in the area around the short axis of the oval, has been provided with a thickening on both inner and outer surfaces of each of the long sides.

On the accompanying drawing is illustrated an embodiment of the invention, in which.

Rope clamp 1 of metal or something similar has the shape of a comparatively thin walled sleeve oval in cross section, and is intended to be compressed in the direction of the long axis of the oval to a preferably circular external shape to fix rope parts 2 and 3, for example to form a loop. In the oval cross section of the clamp the long sides 4 and 5 extend in the direction of the long axis $a$ and have according to the invention a thickening in the area of the short axis $b$ as compared to the thickness of the short sides 6 and 7, these sides being of preferably semi-circular shape. These thickenings in the area of the short axis of the oval might in themselves have any arbitrary shape, but the condition is that the thickening is extended on both sides of the centre lines $c$ and $d$ of the long sides.

Figure 1:
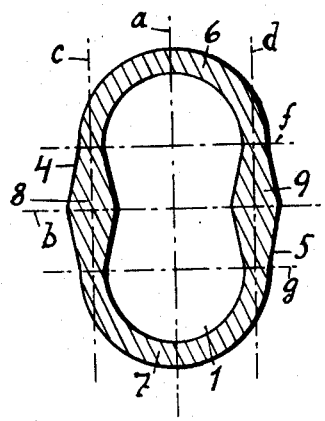
FIGURE 1 shows diagrammatically a cross section of the oval clamp.

In the diagrammatic illustration of the design which is shown in FIGURE 1, the short sides 6 and 7 of the oval are approximately arch shaped with a uniform wall thickness along the semi-circular area until, or very near to, the diametrical lines $f$ and $g$, which are parallel to the short axis $b$, and from there each long side 4 and 5 has a thickening on both surfaces, and this thickening is with advantage successively increased until short axis $b$. On this schematically shown design based on the fundamental idea of the invention, a thickening will thus be provided on each long side being formed by two opposed and truncated triangles with congruent baselines on the short axis when viewed in cross section.

Figure 2:
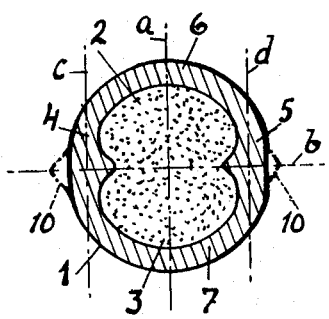
FIGURE 2 is a cross section of same compressed to an approximately circular shape.

As pressure is applied parallel with the long axis and by means of press-dies of normal semi-cylindrical shape being wider than the diameter width of the oval ends, these will then expand to the shape of the press-dies due to the comparatively low pressure at first, and at the same time the long sides are displaced in a sideways direction without any folding due to design according to this invention. Upon increased pressure the oval ends are moved towards one another, but further transformation is prevented by the press-dies, as a result of which the pressure of the oval ends on the connecting surfaces of the long sides along the diametrical line, will give each long side such a centralized staving pressure that every tendency towards folding of the long side is eliminated, and whereby a transformation of the respective wall thickenings on inner and outer surfaces will take place under a displacement of material. By proper dimensioning of the wall thickening the displacement of material inwards around the short axis will equalize the space present between the two rope parts and between the strands which will be homogeneously enclosed. Surplus material on the outside is removed, as indicated in FIGURE 2, in the normal way by the press-dies. The material in the short sides will remain mainly intact, and the material affected by the staving and displacement process consists to all intents and purposes chiefly of the thickening material from the area around the short axis contrary to what is the case with thick walled clamps of uniform thickness.

No folding will thus occur on a comparatively thin walled clamp according to this invention, and all harmful fissuring is thereby eliminated, and as the real displacement of material is mainly restricted to the central area near the short axis without material contribution from the thin walled oval ends, then the high compression pressure previously used can now be reduced to a considerable degree while maintaining full safety margin for the clamp.

Figure 3:
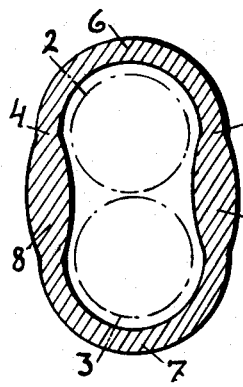
FIGURE 3 is a cross section corresponding to FIGURE 1, but is a more constructive design.
Figure 4:
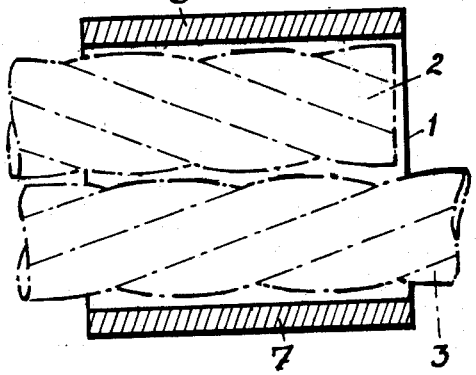
FIGURE 4 is a longitudinal section of same showing the enclosed rope parts fixed in position.

FIGURES 3 and 4 show a technically advantageous design with gentle changes in thickness and rounded surfaces of the walls all in order to assist the transformation when pressure is applied. Adhering to the previously explained basic principle for the centralizing and directional fitting of the wall thickenings between the short ends of the oval, these thickenings are gradually increased in width in a direction towards the area of the short axis by arch-shaped surfaces, when viewed in cross section. One is not restricted to equal width inwards and outwards at the short axis, in relation to the centre line of the long sides.

The details of this device may be subjected to alterations within the scope of the basic idea of this invention.

I claim:

1. A rope clamp comprising a length of tube of a material capable of being upset under heavy compressive stress, said tube being oval in section, the oval of said sections being semi-circular at each end and straight-sided and being comparatively thin-walled, each said side of said oval section varying in thickness progressively and symmetrically about a straight line extending between said thin-walled semi-circular portions from the thickness of said semi-circular portions at the ends of said sides to a maximum thickness mid-length of said sides whereby, upon compressing said clamp by application of heavy pressure on said semi-circular ends, said sides are upset to tightly grip enclosed rope portions.

2. A rope clamp comprising a length of tubular material capable of being upset under a heavy compressive stress, said tubular material being thin-walled and of oval section having semi-cylindrical end portions adapted to seat in semi-cylindrical compression dies, and sides extending between the said semi-cylindrical end portions, said sides being of the same thickness as said semi-cylindrical end portions of said oval section at their junctures with said semi-cylindrical portions and smoothly graduated in thickness symmetrically about a plane connecting said semi-cylindrical end portions from a minimum thickness at their said junctures to a maximum thickness remote from said junctures whereby, upon compression, said sides will be upset symmetrically about straight lines connecting said semi-cylindrical end portions.

3. A rope clamp of material deformable under compressive stress, said clamp being of elongated hollow oval cross-section, the ends of said oval sections being semi-circles, said clamp being comparatively thin-walled at the portions thereof at the semi-circular ends of said oval sections, the side portions of said clamp connecting the thin-walled semi-circular ends of said oval being symmetrical in section, said section progressively varying from the thickness of said comparatively thin-walled semi-circular ends of said sections at each end thereof to a maximum thickness remote from said semi-circular ends, whereby said side portions of said clamp, though of relatively thin section, will be symmetrically upset under compressive stress.

References Cited by the Examiner

UNITED STATES PATENTS

| 650,860 | 6/00 | McTighe. | |
|---|---|---|---|
| 2,346,412 | 4/44 | Bratz | 57—142 |
| 2,610,077 | 9/52 | Swanson | 287—108 |
| 2,999,703 | 9/61 | Myers | 287—78 |
| 3,008,208 | 11/61 | Stephan | 287—108 |

FOREIGN PATENTS

| 525,171 | 5/56 | Canada. |
| 1,029,200 | 4/58 | Germany. |

DONLEY J. STOCKING, *Primary Examiner.*

BOBBY R. GAY, CARL W. TOMLIN, M. HENSON WOOD, JR., *Examiners.*